March 11, 1952   J. DE STEFANO   2,588,493
VALVE FOR STEMS OF PNEUMATIC TIRES
Filed Sept. 16, 1947

Inventor
John De Stefano

By Clarence A. O'Brien
and Harvey B. Jacobson
Attorneys

Patented Mar. 11, 1952

2,588,493

UNITED STATES PATENT OFFICE 2,588,493

VALVE FOR STEMS OF PNEUMATIC TIRES

John De Stefano, Long Island City, N. Y.

Application September 16, 1947, Serial No. 774,401

1 Claim. (Cl. 137—69)

My invention relates to improvements in valves for the stems of pneumatic tires, the primary object being to provide a simple form of valve insides for such stems, in which a valve member is maintained tightly closed and sealed regardless of the pressure in the tire and which will not get out of order through prolonged wear, is easy to insert in the valve stem and remove therefrom with the usual tool, and is comparatively inexpensive to manufacture.

Other and subordinate objects, also within the purview of my invention, together with the precise nature of my improvements will be readily understood when the succeeding description and claim are read with reference to the drawing accompanying and forming part of this specification.

Figure 1:
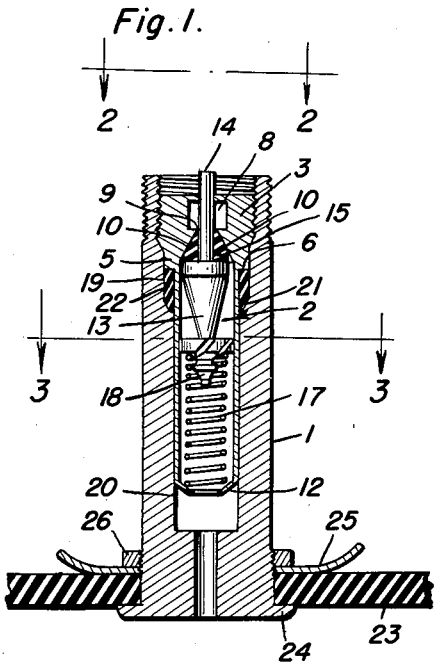
Figure 1 is a view in longitudinal section illustrating my invention in a preferred embodiment thereof.
Figure 4:
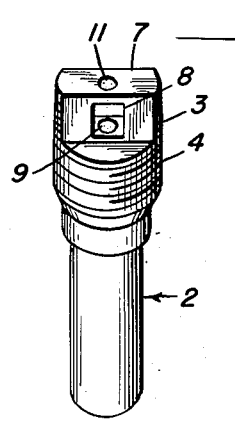
Figure 4 is a view in perspective of the valve casing, valve member and valve seating spring disassembled.
Figure 4:
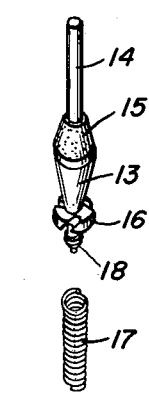
Figure 2:
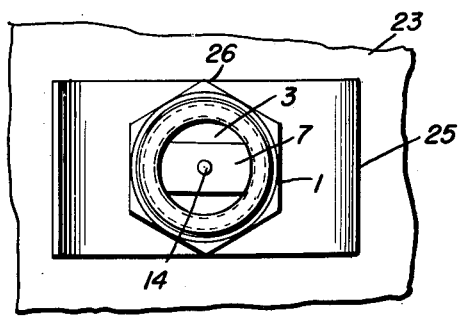
Figure 2 is a view in end elevation.
Figure 3:
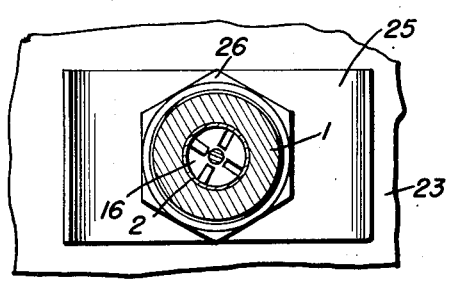
Figure 3 is a view in transverse section taken on the line 3—3 of Figure 1.

Referring now to the drawing by numerals, according to my invention, as illustrated, a valve insides is provided for the tire stem 1 including a generally tubular valve casing 2 with an enlarged outer end head 3 externally threaded, as at 4, and having a reduced bottom portion 5 forming an annular radial, bottom shoulder 6 on said head around said casing 2 for a purpose presently apparent. At its top, the head 3 is reduced to form a diametrical, flat-sided, relatively narrower, outer end rib 7 on said head adapted for straddling by the usual tool, not shown, to turn said head into said stem 1 in a manner presently explained. A transverse, central opening 8 is formed in said rib 7 for passing air through the same into said casing 2 by way of an axial, relatively smaller, air inlet port 9 at the bottom of said opening 8 and at the outer end of a valve seat 10 tapering toward said port 9 in the axis of said casing 2. A guide opening 11 is provided in said rib 7 at the top of the opening 8 and in the axis of said casing 2 for a valve member, presently described. The inner end of the valve casing 2 is open with an internal flange 12 for a purpose to be explained. The flange 12 may be formed after the insides are assembled and by bending the inner end of said casing 2 inwardly.

A valve member is provided in the valve casing 2 comprising a body 13 tapering for the greater portion of its length from the valve seat 10 and having an axial, cylindrical reduced outer end post 14 on its larger end extending through said port 9 clear of the same and slidably extended through the guide opening 11 and out of the head 3. A tapered, resilient gasket 15 surrounds said post 14 and rests on the larger end of the body 13 to seat in the valve seat 10. The gasket 15 may be fixed to said post 14 and body 13, in any suitable manner, or merely sleeved onto said post. As will be seen in Figure 1, the larger end of the body 13 clears the inside of the valve casing 2, likewise the larger end of the gasket 15. A spider 16 is formed on the body 13 at its smaller end to slide in the casing 2. A coil spring 17 in the valve casing 2 is interposed between the flange 12 and the spider 17 with a pilot terminal 18 on said body 13 inserted therein, and urges said body 13 toward the valve seat 10 to seat said valve member.

The valve casing 2 is removably inserted in the stem 1 by turning the head 3 into the outer threaded end of said stem and with the reduced bottom portion of said head 3 fitted part way into a constricted portion 19 of the bore of said stem and the remainder of said casing 2 fitted in a further constricted portion 20 of said bore. The constricted portion 19 has a bevelled inner end 21 and a tubular resilient gasket 22 is provided in said portion 19 between the shoulder 6 and said bevelled end 21 which is compressed when the head 3 is turned home to form a tight seal between said stem 1 and the valve casing 2. The tire stem 1 is secured to the tube 23 by the usual flange 24, guard 25 and lock nut 26.

As will be clear, air under pressure introduced into the outer end of the tire stem 1 passes through the opening 8 to the port 9 and unseats the described valve member to pass the body 13 thereof and pass through the spider 16 and out of said casing 2 to issue out of said stem.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claim.

Having described the invention what is claimed as new is:

A tubular valve stem having an internally threaded outer end, a substantially tubular valve casing in said stem having an outer end head turned into the outer end of said stem, said head having an inwardly tapered valve seat therein forming an inlet port, a valve member in said casing having a reduced post extending through said seat, and spring means in said casing for seating said valve member against said seat, said valve member having a body clearing the inside of said casing for the passage of air past the same and tapering inwardly of said casing, and said post having a resilient gasket thereon tapered outwardly of said casing and backed by said body for fitting in said seat, said gasket clearing the inside of said casing to permit air to pass the same when said valve member is unseated.

JOHN DE STEFANO.

REFERENCES CITED

The following references are of record in the file of this patent:

UNITED STATES PATENTS

| Number | Name | Date |
|---|---|---|
| 1,126,464 | Hedger | Jan. 26, 1915 |
| 1,133,042 | Kull | Mar. 23, 1915 |
| 1,334,996 | Greene | Mar. 30, 1920 |
| 1,367,815 | Henemier | Feb. 8, 1921 |
| 2,272,548 | Creamer | Feb. 10, 1942 |

FOREIGN PATENTS

| Number | Country | Date |
|---|---|---|
| 354,737 | Italy | Dec. 6, 1937 |